(12) United States Patent
Kuwada et al.

(10) Patent No.: US 9,654,669 B2
(45) Date of Patent: May 16, 2017

(54) COLOR PROCESSING APPARATUS, COLOR PROCESSING METHOD, AND IMAGE FORMING SYSTEM CONFIGURED FOR GENERATING A CONVERSION RELATIONSHIP UNIQUE TO A PAGE NUMBER AS CONVERSION RELATIONSHIP FOR PERFORMING COLOR ADJUSTMENT

(71) Applicant: FUJI XEROX CO., LTD., Tokyo (JP)

(72) Inventors: Yoshitaka Kuwada, Kanagawa (JP); Ryosuke Higashikata, Kanagawa (JP); Jungo Harigai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/827,609

(22) Filed: Aug. 17, 2015

(65) Prior Publication Data

US 2016/0277642 A1    Sep. 22, 2016

(30) Foreign Application Priority Data

Mar. 19, 2015   (JP) .................................. 2015-056820

(51) Int. Cl.
*H04N 1/60*      (2006.01)
*G03G 15/01*    (2006.01)
*G03G 15/00*    (2006.01)

(52) U.S. Cl.
CPC ........... *H04N 1/6033* (2013.01); *G03G 15/01* (2013.01); *G03G 15/5025* (2013.01); *G03G 2215/0129* (2013.01); *G03G 2215/0164* (2013.01)

(58) Field of Classification Search
USPC .................................. 358/1.9, 2.1, 3.23, 3.26
See application file for complete search history.

(56) References Cited

U.S. PATENT DOCUMENTS

| 9,013,754 B1* | 4/2015 | Sugi | H04N 1/46 358/1.9 |
|---|---|---|---|
| 2013/0155468 A1* | 6/2013 | Ukishima | H04N 1/603 358/3.23 |

FOREIGN PATENT DOCUMENTS

| JP | 2012-070360 A | 4/2012 |
|---|---|---|
| JP | 2013-042463 A | 2/2013 |

\* cited by examiner

*Primary Examiner* — Marcellus Augustin
(74) *Attorney, Agent, or Firm* — Oliff PLC

(57) ABSTRACT

A color processing apparatus includes an area group manager, a predictor, and a conversion relationship generator. The area group manager extracts, as an area group, a particular area on each page from image data in which one copy is constituted of multiple pages, and manages the area group in association with a page number. The predictor obtains color data of the image data output by an image forming section, and predicts a color variation on the basis of color data corresponding to the area group. The conversion relationship generator generates, on the basis of the color variation of the area group corresponding to a particular page number, a conversion relationship unique to the particular page number as a conversion relationship for performing color adjustment of the image forming section.

10 Claims, 16 Drawing Sheets

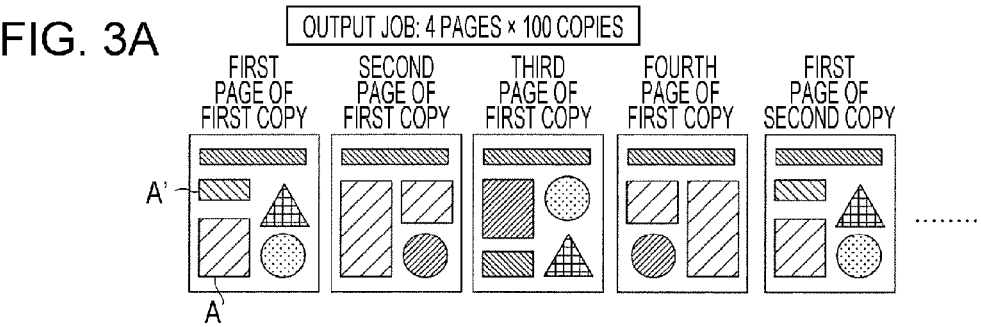
FIG. 3A
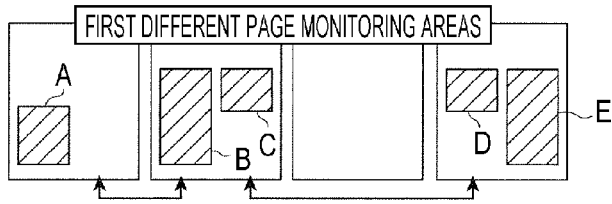
FIG. 3B
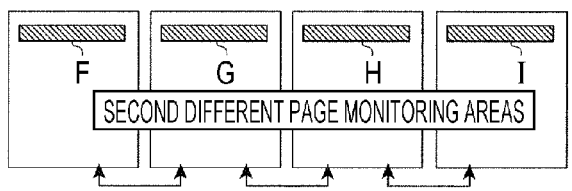
FIG. 3C
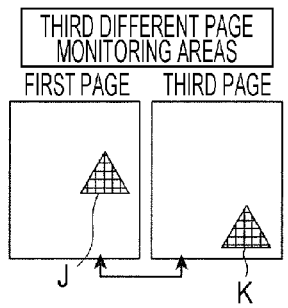
FIG. 3D
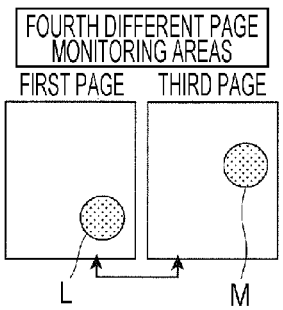
FIG. 3E
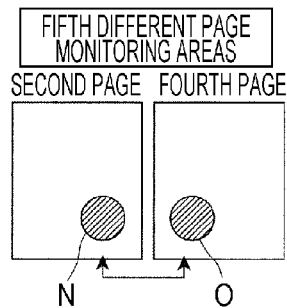
FIG. 3F
FIG. 3G
| MONITOR NO. | PAGE | AREA | POSITION INFORMATION/ IMAGE INFORMATION |
|---|---|---|---|
| FIRST DIFFERENT | 1 | A | ... |
| FIRST DIFFERENT | 2 | B | ... |
| FIRST DIFFERENT | 2 | C | ... |
| FIRST DIFFERENT | 4 | D | ... |
| FIRST DIFFERENT | 4 | E | ... |
| SECOND DIFFERENT | 1 | F | ... |
| SECOND DIFFERENT | 2 | G | ... |
| SECOND DIFFERENT | 3 | H | ... |
| SECOND DIFFERENT | 4 | I | ... |
| ... | ... | ... | ... |

FIG. 4A
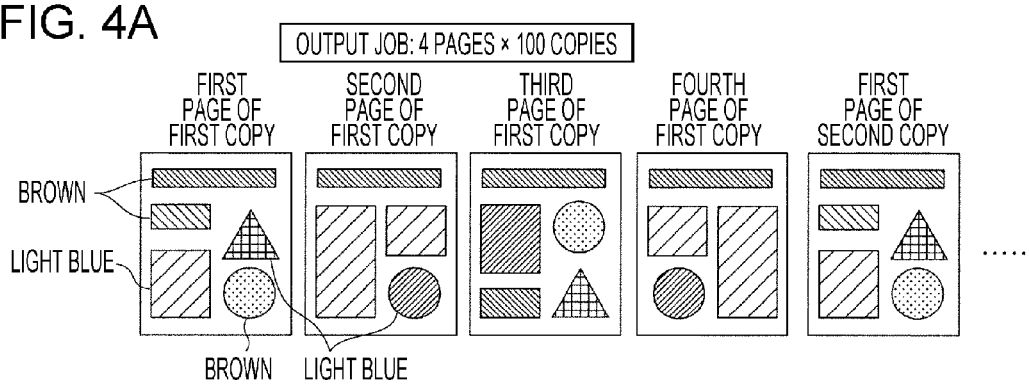
FIG. 4B
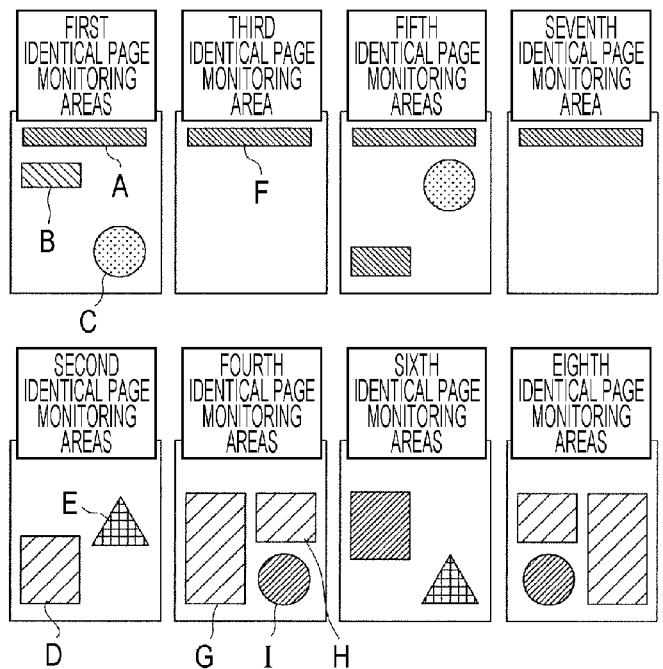
FIG. 4C
| MONITOR NO. | PAGE | AREA | POSITION INFORMATION/ IMAGE INFORMATION |
|---|---|---|---|
| FIRST IDENTICAL | 1 | A | ... |
| FIRST IDENTICAL | 1 | B | ... |
| FIRST IDENTICAL | 1 | C | ... |
| SECOND IDENTICAL | 1 | D | ... |
| SECOND IDENTICAL | 1 | E | ... |
| THIRD IDENTICAL | 2 | F | ... |
| FOURTH IDENTICAL | 2 | G | ... |
| FOURTH IDENTICAL | 2 | H | ... |
| FOURTH IDENTICAL | 2 | I | ... |
| ... | ... | ... | ... |

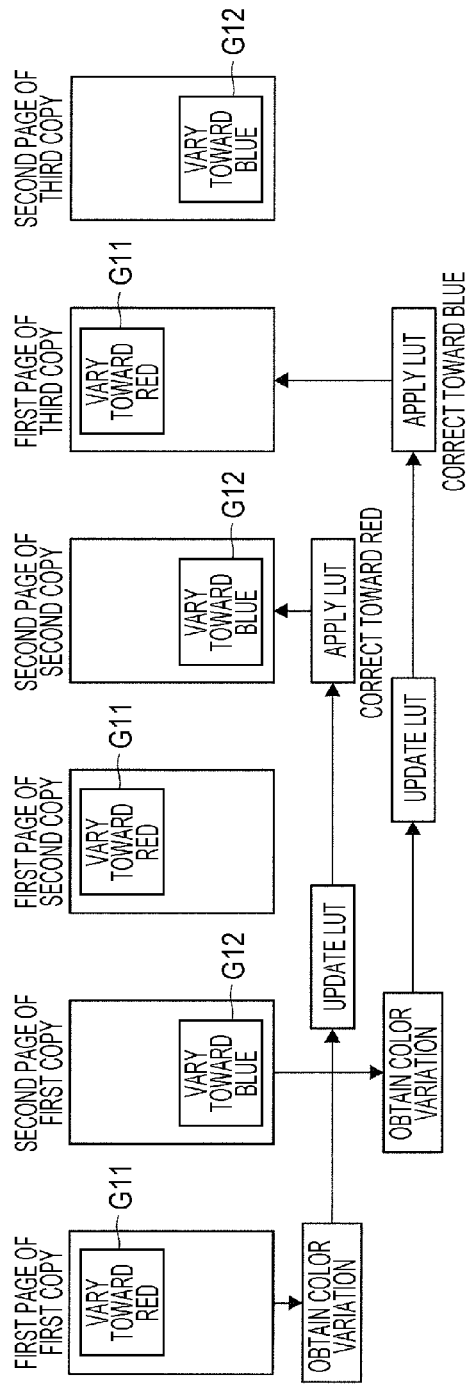
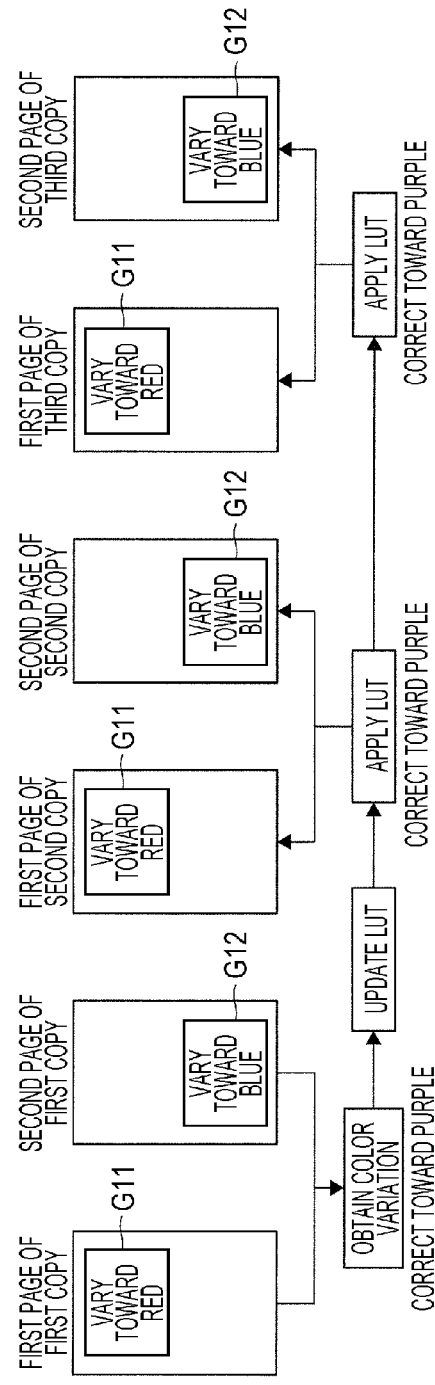
FIG. 6A
FIG. 6B

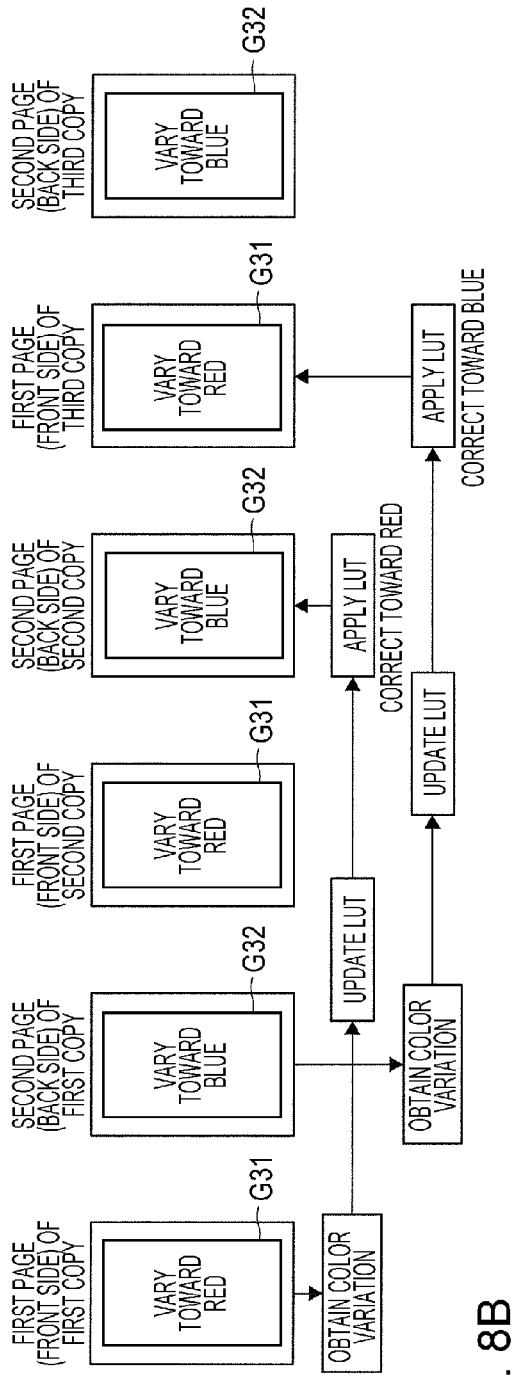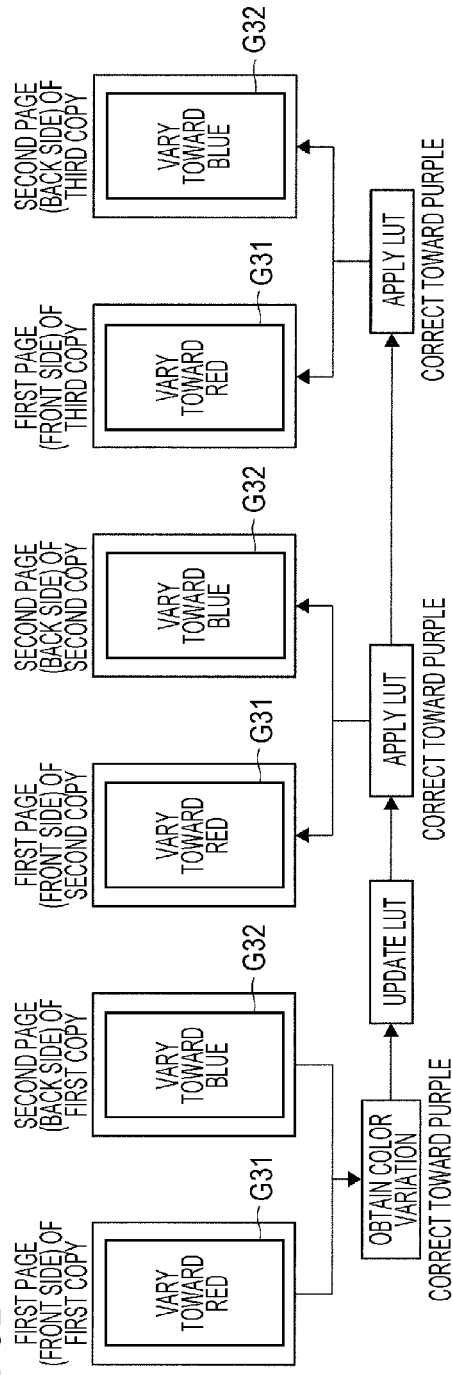

COLOR PROCESSING APPARATUS, COLOR PROCESSING METHOD, AND IMAGE FORMING SYSTEM CONFIGURED FOR GENERATING A CONVERSION RELATIONSHIP UNIQUE TO A PAGE NUMBER AS CONVERSION RELATIONSHIP FOR PERFORMING COLOR ADJUSTMENT

CROSS-REFERENCE TO RELATED APPLICATIONS

This application is based on and claims priority under 35 USC 119 from Japanese Patent Application No. 2015-056820 filed Mar. 19, 2015.

BACKGROUND (i) Technical Field

The present invention relates to a color processing apparatus, a color processing method, and an image forming system.

(ii) Related Art

In some cases, a conversion relationship is used to adjust color variations in an image forming section. To do calibration for updating the conversion relationship in accordance with the color variations, calibration may be done using an image designated by a user to be printed (a user image). However, the color variations may be different in each page to be printed, and, in that case, the accuracy of color adjustment may be degraded.

SUMMARY

According to an aspect of the invention, there is provided a color processing apparatus including an area group manager, a predictor, and a conversion relationship generator. The area group manager extracts, as an area group, a particular area on each page from image data in which one copy is constituted of multiple pages, and manages the area group in association with a page number. The predictor obtains color data of the image data output by an image forming section, and predicts a color variation on the basis of color data corresponding to the area group. The conversion relationship generator generates, on the basis of the color variation of the area group corresponding to a particular page number, a conversion relationship unique to the particular page number as a conversion relationship for performing color adjustment of the image forming section.

BRIEF DESCRIPTION OF THE DRAWINGS

An exemplary embodiment of the present invention will be described in detail based on the following figures, wherein:

FIGS. 3A to 3G are diagrams for describing exemplary different page monitoring information;

FIGS. 4A to 4C are diagrams for describing exemplary identical page monitoring information;

FIG. 6A is a diagram illustrating a first example of color variations that occur in units of pages, and a problem that occurs in this case;

FIG. 6B is a diagram illustrating the case in which a four-dimensional look up table (LUT) is generated on the basis of color variations on all pages;

FIG. 8A is a diagram illustrating a third example of color variations that occur in units of pages, and a problem that occurs in this case;

FIG. 8B is a diagram illustrating the case in which a four-dimensional LUT is generated on the basis of color variations on all pages;

DETAILED DESCRIPTION

In the case of outputting an image by an image forming apparatus, color tones may vary due to aging of each section during operation (that is, color variations occur). To avoid this problem, it is generally done in an image forming apparatus to adjust colors to be output to colors in a standard state (initial state) of the image forming apparatus (hereinafter, this is referred to as color adjustment).

One exemplary method of performing color adjustment uses a multi-dimensional LUT. Since color variations change over time, calibration for updating the multi-dimensional LUT is necessary.

To do calibration, it is necessary to know the current output state of the image forming apparatus. To know the current output state, generally a color patch image is printed, and this image is measured by a colorimeter or the like to obtain color data. In this case, it is necessary to print about one thousand color patches in order to update the multi-dimensional LUT. When calibration is done during a print job, the print productivity is lowered by printing these color patches.

In contrast, another method uses an image designated by a user to be printed (a user image) to do calibration. This method extracts data on an image flat portion of image data that the user wants to output, and color data to be used in updating the multi-dimensional LUT is obtained from the extracted data.

Description of Internal Configuration of Image Forming Apparatus

Hereinafter, an exemplary embodiment of the present invention will be described in detail with reference to the attached drawings.

Figure 1:
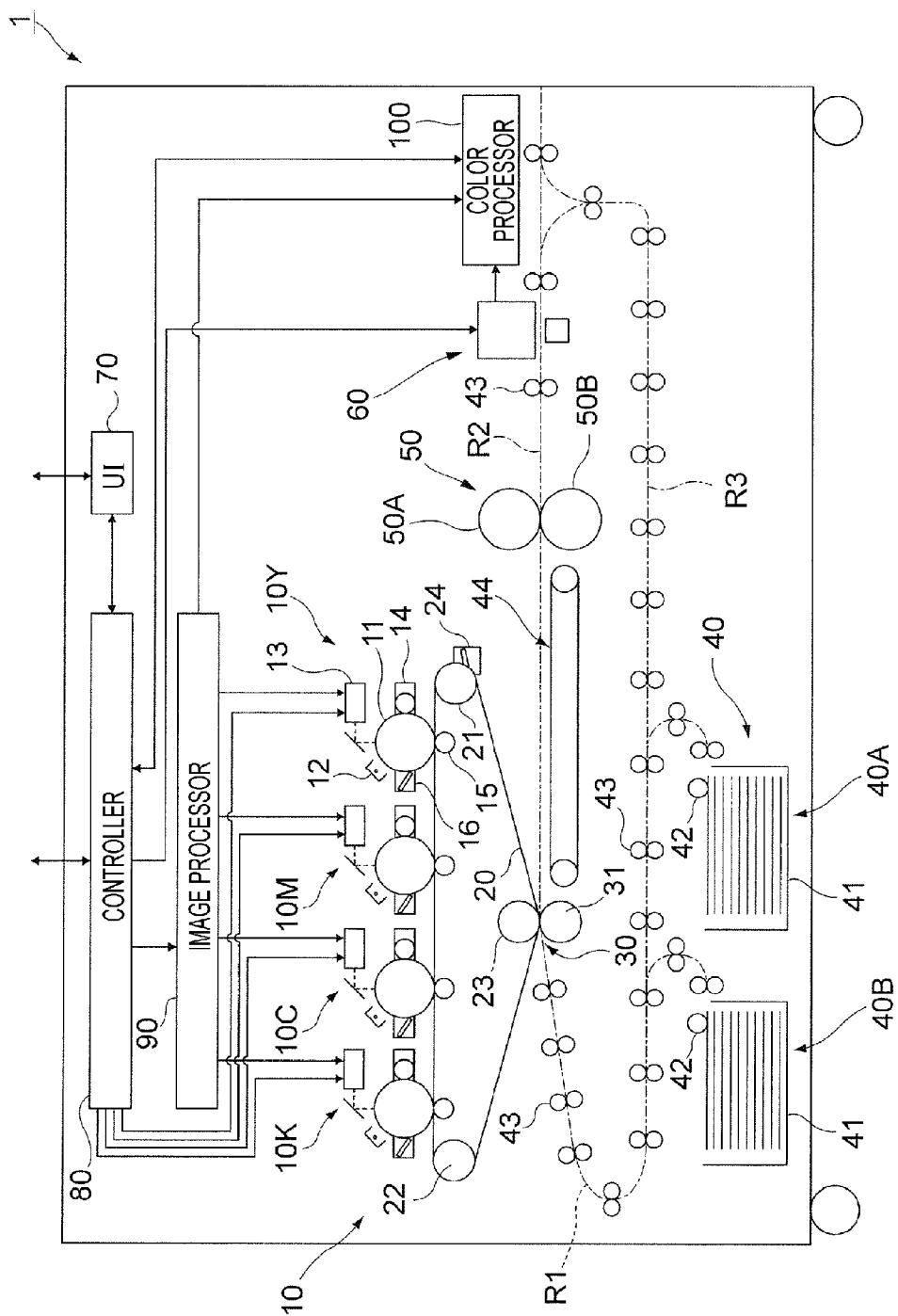
FIG. 1 is a diagram illustrating an exemplary internal configuration of an image forming apparatus according to an exemplary embodiment.

FIG. 1 is a diagram illustrating an exemplary internal configuration of an image forming apparatus according to the exemplary embodiment. An image forming apparatus (image forming system) 1 according to the exemplary embodiment has a so-called tandem configuration, and is a plateless printer that prints an image using an electrophotographic system. The image forming apparatus 1 includes an image forming section 10 that forms an image on paper (recording material); an image reading section 60 that reads an image formed on paper; a user interface (UI) 70 that accepts a command from the user or displays an alert, for example; a controller 80 that includes a central processing unit (CPU), a read-only memory (ROM), and a random-access memory (RAM) and that controls each section included in the image forming apparatus 1; an image processor 90 that processes image data transmitted to the image forming apparatus 1; and a color processor 100 that monitors color variations of an image and generates a conversion relationship for performing color adjustment. The image forming section 10 includes image forming units 10Y, 10M, 10C, and 10K, an intermediate transfer belt 20, a secondary transfer device 30, a paper feeder 40, and a fixing device 50.

The image forming apparatus 1 includes the image forming units 10Y, 10M, 10C, and 10K, which form toner images of respective color components by using an electrophotographic system. Here, the image forming units 10Y, 10M, 10C, and 10K form yellow, magenta, cyan, and black toner images, respectively.

The image forming apparatus 1 also includes the intermediate transfer belt 20, to which toner images of the color components respectively formed by the image forming units 10Y, 10M, 10C, and 10K are sequentially transferred (first transfer), and that hold these toner images, and the secondary transfer device 30, which collectively transfers the toner images on the intermediate transfer belt 20 onto paper formed in a rectangular shape (second transfer).

Here, the image forming units 10Y, 10M, 10C, and 10K each include a photoconductor drum 11 that is rotatably attached. In each of the image forming units 10Y, 10M, 10C, and 10K, a charging device 12 that charges the photoconductor drum 11, an exposure device 13 that exposes the photoconductor drum 11 to light and writes an electrostatic latent image, and a developing device 14 that visualizes the electrostatic latent image on the photoconductor drum 11 using a corresponding one of the color toners are provided around the photoconductor drum 11. Furthermore, the image forming units 10Y, 10M, 10C, and 10K each include a first transfer device 15 that transfers a toner image of a corresponding one of the color components, formed on the photoconductor drum 11, to the intermediate transfer belt 20, and a drum cleaning device 16 that removes the toner remaining on the photoconductor drum 11.

Next, the intermediate transfer belt 20 is placed across three roll members 21 to 23, which are rotatably provided, so as to rotate. Among the three roll members 21 to 23, the roll member 22 drives the intermediate transfer belt 20. In addition, the roll member 23 is placed opposite a secondary transfer roll 31 across the intermediate transfer belt 20, and the secondary transfer roll 31 and the roll member 23 configure the secondary transfer device 30. At a position opposite the roll member 21 across the intermediate transfer belt 20, a belt cleaning device 24 that removes the toner remaining on the intermediate transfer belt 20 is provided.

In the image forming apparatus 1, a first conveyance route R1 through which paper fed toward the secondary transfer device 30 passes, a second conveyance route R2 through which the paper which has passed the secondary transfer device 30 passes, and a third conveyance route R3 that is branched from the second conveyance route R2, downstream of the fixing device 50 (described later), and extended to below the first conveyance route R1, and that guides the paper again to the first conveyance route R1 are provided. Among sheets of paper that have been fed along the second conveyance route R2, those that are not guided to the third conveyance route R3 are ejected out of the image forming apparatus 1 and stacked on a paper staking section (not illustrated).

The image forming apparatus 1 also includes the paper feeder 40, which feeds paper along the first conveyance route R1, the second conveyance route R2, and the third conveyance route R3. The paper feeder 40 includes a first paper supply device 40A that supplies paper to the first conveyance route R1, and a second paper supply device 40B that is provided downstream in a paper feeding direction of the first paper supply device 40A and that supplies paper to the first conveyance route R1. The first paper supply device 40A and the second paper supply device 40B have the same configuration, and the first paper supply device 40A and the second paper supply device 40B each include a paper accommodating section 41 that accommodates paper, and an ejection roll 42 that takes out the paper accommodated in the paper accommodating section 41 and feeds the paper. Here, the first paper supply device 40A and the second paper supply device 40B may accommodate sheets of paper that have different sizes and/or directions and/or that are of different types.

Furthermore, the paper feeder 40 includes multiple conveyance rolls 43 that sandwich and convey paper in the first conveyance route R1, the second conveyance route R2, and the third conveyance route R3. Yet furthermore, the paper feeder 40 includes a belt conveying section 44 that conveys, in the second conveyance route R2, paper that has passed the secondary transfer device 30 toward the fixing device 50.

The image forming apparatus 1 further includes, in the second conveyance route R2, the fixing device 50, which fixes an image that has been secondary-transferred on paper by the secondary transfer device 30 to this paper. The fixing device 50 includes a heat roll 50A that is heated by a built-in heater (not illustrated), and a press roll 50B that presses the heat roll 50A. In the fixing device 50, paper passes in between the heat roll 50A and the press roll 50B, and accordingly the paper is heated and pressed, thereby fixing an image on the paper to the paper.

The image forming apparatus 1 includes the image reading section 60, which reads, with the use of an image sensor, an image formed on paper after going through secondary transfer and fixing. The image reading section 60 is provided, in the second conveyance route R2, downstream in the paper feeding direction of the fixing device 50 and upstream in the paper feeding direction of the junction between the second conveyance route R2 and the third conveyance route R3. Out of paper that passes the secondary transfer device 30, the image reading section 60 is configured to read an image on a side that faces the intermediate transfer belt 20, that is, a side on which secondary transfer of an image has just been done.

Description of Functional Configuration of Image Forming Apparatus

Next, the function of each section included in the image forming apparatus 1 will be described.

Figure 2:
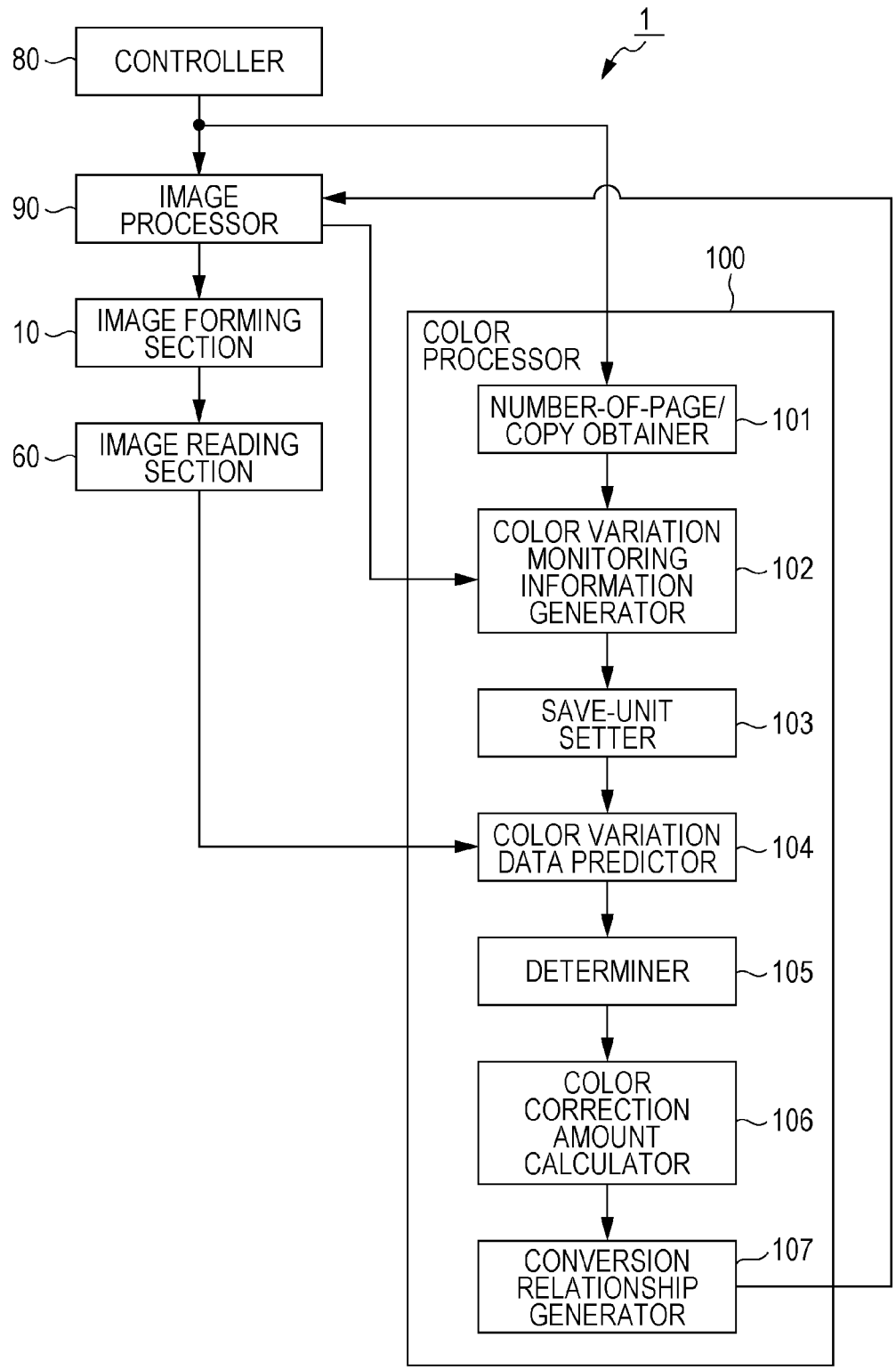
FIG. 2 is a block diagram illustrating an exemplary functional configuration of the image forming apparatus according to the exemplary embodiment.

FIG. 2 is a block diagram illustrating an exemplary functional configuration of the image forming apparatus 1 according to the exemplary embodiment.

The controller 80 receives a print job transmitted from the user. Regarding the print job, the controller 80 may be configured to receive the print job accepted by the UI 70 (see FIG. 1) from the UI 70, or to receive the print job directly from the user. In addition, the print job is one group of data items transmitted along with a print instruction from the user, and includes details of an image to be printed, details of the number of prints, such as the number of pages and the number of copies to be printed, and details of the form of printing, such as the number of pages to be printed on one sheet of paper, and whether single or duplex printing is to be performed. The controller 80 transmits the print job to the image processor 90 and to a number-of-page/copy obtainer 101.

The image processor 90 performs image processing, such as color conversion and rasterization, of input image data included in the print job transmitted from the controller 80. In general, image data included in a print job is described in a page description language (PDL) such as PostScript (PS) or Portable Document Format (PDF). In order to output the image data as an image, the image data needs to be converted to a raster image, and this process is referred to as rasterization. A raster image is image data representing an image with numerous colored dots, and rasterization is executed using a conversion engine such as Configurable PostScript Interpreter (CPSI) or Adobe PDF Print Engine (APPE). A raster image is an example of image data for forming an image by the image forming section 10.

In addition, the image processor 90 is an example of a color adjuster and performs the above-mentioned color adjustment of an image formed by the image forming section 10. The image processor 90 performs color adjustment of YMCK data so as to match target colors that should be output by the image forming section 10 in accordance with the YMCK data. In this case, the color adjustment is, for example, a process of converting $Y_{in}M_{in}C_{in}K_{in}$ data to $Y_{out}M_{out}C_{out}K_{out}$ data $Y_{in}M_{in}C_{in}K_{in}$) to $Y_{out}M_{out}C_{out}K_{out}$)). In the exemplary embodiment, this conversion is performed using a so-called device link profile that directly converts $Y_{in}M_{in}C_{in}K_{in}$ data to $Y_{out}M_{out}C_{out}K_{out}$ data that is in the same YMCK color space as the $Y_{in}M_{in}C_{in}K_{in}$ data, without converting to another color space such as the L*a*b* color space.

In the exemplary embodiment, a device link profile is an example of a conversion relationship, and is generated as a four-dimensional LUT.

The image forming section 10 is an example of an image forming section, and sequentially forms and outputs images on paper on the basis of a raster image generated by rasterization performed by the image processor 90.

The image reading section 60 includes, for example, a line sensor having charge coupled devices (CCDs) arranged in a line. Accordingly, the image reading section 60 reads chromatic components of an image formed on paper by the image forming section 10, and generates color data. As the color data, L*a*b* values are used, for example, as device-independent data. L*a*b* values are values defined in the L*a*b* color space, which is also referred to as the CIELAB color space. In addition, the L*a*b* color space is represented by a Cartesian-coordinate color space having the lightness L* and the chromatic components a* and b* representing color tones as axes.

The color processor 100 is an example of a conversion relationship generating section and a color processing apparatus, and generates a four-dimensional LUT used for performing color adjustment by the image processor 90. The color processor 100 includes the number-of-page/copy obtainer 101, a color variation monitoring information generator 102, a save-unit setter 103, a color variation data predictor 104, a determiner 105, a color correction amount calculator 106, and a conversion relationship generator 107.

The number-of-page/copy obtainer 101 obtains information on the number of pages per copy of an image to be output, and the total number of copies, on the basis of the print job transmitted from the controller 80.

The color variation monitoring information generator 102 is an example of an area group manager, extracts an area group, and manages the area group in association with a page number(s). In accordance with the number of pages per copy and the total number of copies, obtained by the number-of-page/copy obtainer 101, the color variation monitoring information generator 102 extracts an area group (hereinafter referred to as color variation monitoring areas) for monitoring color variations in an image to be output, from a raster image generated by the image processor 90. In other words, the color variation monitoring information generator 102 extracts, from a raster image for forming an image by the image forming section 10, particular areas on each page as color variation monitoring areas. The color variation monitoring information generator 102 also generates information regarding the extracted color variation monitoring areas as monitoring information (hereinafter referred to as color variation monitoring information). The color variation monitoring information generator 102 manages a color variation monitoring area in association with a page number. Color variation monitoring information includes information for specifying a color variation monitoring area. For example, color variation monitoring information includes position information or image information of a color variation monitoring area, details of which will be described later.

The save-unit setter 103 is an example of a setter, and sets a particular page number within one copy as a unit for performing color adjustment of the image forming section 10. The setting of saving color data by the save-unit setter 103 will be described later.

The color variation data predictor 104 is an example of a predictor. The color variation data predictor 104 obtains color data of image data output by the image forming section 10, and predicts a color variation as a difference on the basis of color data corresponding to a color variation monitoring area. Color variation prediction performed by the color variation data predictor 104 will be described in detail later.

The determiner 105 determines whether to update a four-dimensional LUT for performing color adjustment, on the basis of the color variations predicted by the color variation data predictor 104. In short, the accuracy of color adjustment becomes lower in a four-dimensional LUT for color adjustment that has been used up to that moment, due to color variations in the image forming section 10. Therefore, it becomes necessary to update the four-dimensional LUT in accordance with the color variations in the image forming section 10. That is, it is necessary to perform calibration. The determiner 105 determines to update the four-dimensional LUT in the case where the amount of color variation is greater than or equal to a predetermined threshold. In contrast, the determiner 105 determines not to update the four-dimensional LUT in the case where the amount of color variation is less than the predetermined threshold. The amount of color variation used in this determination is, for example, the average of color variations predicted by the color variation data predictor 104.

In the exemplary embodiment, the determiner 105 is provided, and calibration is performed when necessary. In doing so, the costs involved in calibration are reduced, compared with the case of periodically performing calibration. The occurrence of short-term color variations is also handled easily, compared with the case of periodically performing calibration.

The color correction amount calculator 106 calculates the amount of color correction, which is necessary for updating the four-dimensional LUT. Specifically, the color correction amount calculator 106 calculates the amount of color correction in the YMCK color space from the difference predicted by the color variation data predictor 104. Specifically, the calculated are $\Delta Y$, $\Delta M$, $\Delta C$, and $\Delta K$.

On the basis of color variations in a color variation monitoring area corresponding to a particular page number, the conversion relationship generator 107 generates a four-dimensional LUT that is unique to the particular page number as a four-dimensional LUT for performing color adjustment of the image forming section 10.

Here, adding the correction amounts $\Delta Y$, $\Delta M$, $\Delta C$, and $\Delta K$ to uncorrected YMCK values at each lattice point of the four-dimensional LUT which has been used up to that moment results in corrected YMCK values. Since the four-dimensional LUT is a device link profile in this case, the four-dimensional LUT is described as a correspondence relationship between input values $(Y_0, M_0, C_0, K_0)$-corrected values $(Y_1, M_1, C_1, K_1)$ at each lattice point. In this case, the corrected values $(Y_1, M_1, C_1, K_1)$ may be corrected by adding $\Delta Y$, $\Delta M$, $\Delta C$, and $\Delta K$. Alternatively, the input values $Y_0$, $M_0$, $C_0$, $K_0$ may be corrected instead.

Even when color adjustment is performed using the obtained four-dimensional LUT, an error may occur, resulting in differences from target colors. In such a case, the color correction amount calculator 106 further updates base data and further updates the four-dimensional LUT, which is repeated until there becomes no or less differences. In doing so, the four-dimensional LUT with fewer errors is obtained.

Description of Color Variation Monitoring Information

Next, color variation monitoring information generated by the color variation monitoring information generator 102 will be described.

FIGS. 3A to 3G are diagrams for describing exemplary different page monitoring information.

Hereinafter, the term "copy" refers to a unit of printing the same details, and, for example, the phrase "print four copies" refers to printing four sets of the same details. The term "page" refers to one side of one sheet of paper.

Different page monitoring information is color variation monitoring information for monitoring color variations between different pages. The different page monitoring information illustrated in FIGS. 3A to 3G is in the case of outputting 100 copies of four-page image data. For example, color variations are monitored between different pages, such as the first to fourth pages of the first copy and the first page of the second copy.

FIG. 3A is a diagram illustrating output pages, namely, the first to fourth pages of the first copy and the first page of the second copy. FIGS. 3B to 3F are diagrams illustrating color variation monitoring areas for monitoring color variations between different pages. FIG. 3G is a diagram illustrating different page monitoring information.

FIG. 3B illustrates color variation monitoring areas that are areas where a color within the areas is uniform (hereinafter referred to as uniform areas) and that have the same color signal among the uniform areas. The sizes of uniform areas need not be the same as long as the uniform areas have the same color signal within the uniform areas. Although A' in FIG. 3A is a uniform area, A' has a color signal that is different from A to E; thus, A' is not a color variation monitoring area for monitoring color variations between different pages. The areas A to E will be referred to as first different page monitoring areas.

FIG. 3C illustrates color variation monitoring areas that are objects of the same size and that have the same color signal among the objects (hereinafter referred to as identical objects). Exemplary identical objects include templates and forms of various applications, and logos. The areas F to I will be referred to as second different page monitoring areas. Although FIG. 3C is a diagram illustrating the case in which the positions at which the identical objects are arranged within pages are the same among these pages, identical objects may be arranged at different positions among pages as long as the identical objects are objects of the same size and have the same color signal among the objects, like J and K in FIGS. 3D, L and M in FIGS. 3E, and N and O in FIG. 3F. Hereinafter, J and K in FIGS. 3D, L and M in FIGS. 3E, and N and O in FIG. 3F will be referred to as third to fifth different page monitoring areas, respectively.

Position information or image information (binary images) of the uniform areas in FIG. 3B and the identical objects in FIGS. 3C to 3F is listed and registered, as illustrated in FIG. 3G, and is generated as different page monitoring information. In the case of rectangular color variation monitoring areas, such as the areas A to I in FIGS. 3A to 3C, the color variation monitoring information generator 102 simply registers, as position information, the coordinate position (X,Y) of the upper left-hand corner of each color variation monitoring area, the width (W) of each color variation monitoring area, and the height (H) of each color variation monitoring area. Instead of the position information, the color variation monitoring information generator 102 may register, as image information, binary images of each color variation monitoring area and other areas. In the case where color variation monitoring areas are not rectangular, such as the areas J to O in FIG. 3D to 3F, the color variation monitoring information generator 102 does not register position information, but registers image information. As illustrated in FIG. 3G, each color variation monitoring area is registered in association with a page number.

FIGS. 4A to 4C are diagrams for describing exemplary identical page monitoring information.

Identical page monitoring information is color variation monitoring information for monitoring color variations between identical pages. The identical page monitoring information illustrated in FIGS. 4A to 4C is in the case of outputting 100 copies of four-page image data. For example, color variations are monitored between identical pages, such as the first page of the first copy, the first page of the second copy, and the first page of the third copy.

FIG. 4A is a diagram illustrating output pages, namely, the first to fourth pages of the first copy and the first page of the second copy. FIG. 4B is a diagram illustrating color variation monitoring areas for monitoring color variations between identical pages. FIG. 4C is a diagram illustrating identical page monitoring information.

FIG. 4B illustrates color variation monitoring areas having similar color signals among pages. For example, brownish color variation monitoring areas A to C and light-bluish color variation monitoring areas D and E are extracted from the first page of the first copy. The brownish areas and the light-bluish areas on the first to fourth pages will be sequentially referred to as first to eighth identical page monitoring areas. Position information or image information (binary images) of the areas having similar color signals in FIG. 4B is listed and registered, as illustrated in FIG. 4C, and is generated as identical page monitoring information. As illustrated in FIG. 4C, each color variation monitoring area is registered in association with a page number. Here, as color variation monitoring areas between identical pages, not only areas having similar color signals, but also areas including various color signals within pages may be extracted, or only uniform areas may be extracted.

Figure 5C:
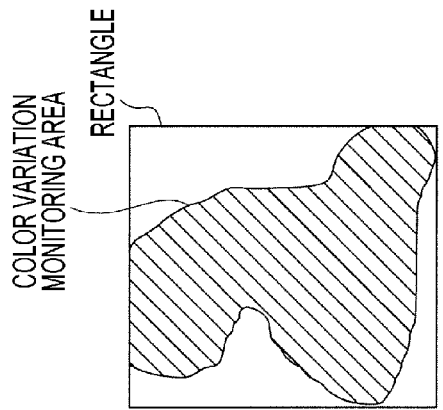
FIGS. 5A to 5C are diagrams illustrating a method of generating a color variation monitoring area.
Figure 5B:
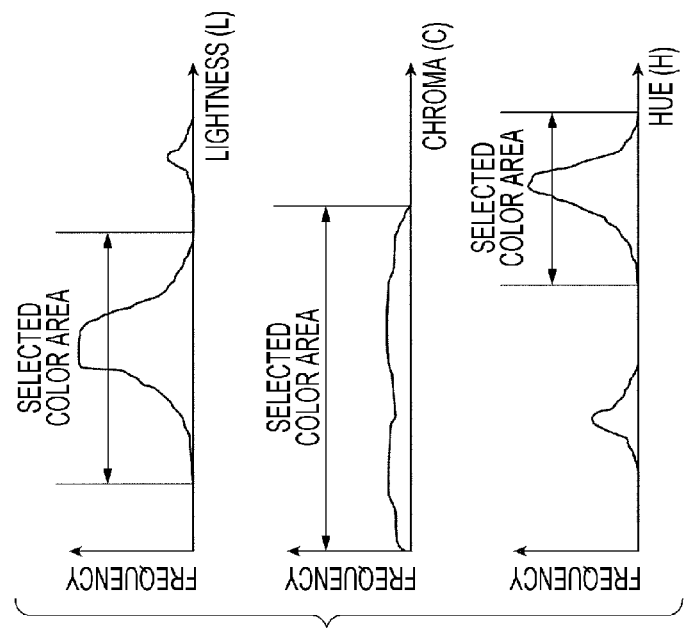
Figure 5A:
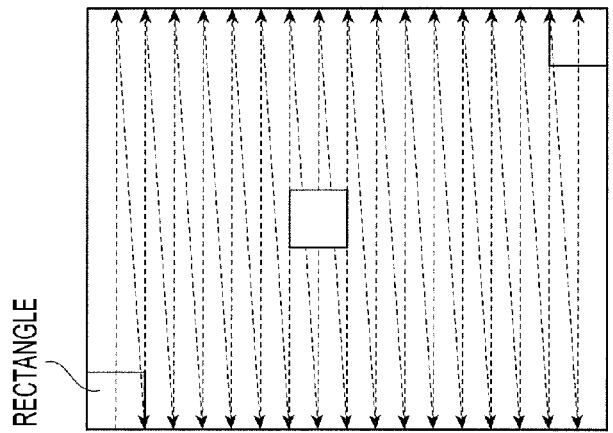

FIGS. 5A to 5C are diagrams illustrating a method of generating a color variation monitoring area.

The color variation monitoring information generator 102 scans a raster image with a rectangle of a predetermined size, as illustrated in FIG. 5A. The color variation monitoring information generator 102 generates a histogram of pixel values included in each rectangle.

FIG. 5B illustrates exemplary histograms generated for one rectangle.

Referring to FIG. 5B, the case is illustrated in which a raster image represented by YMCK values is converted to color values in the L*C*H* color space representing colors in terms of lightness (L*), chroma (C*), and hue (H*), and a histogram of each of lightness (L*), chroma (C*), and hue (H*) is generated. The horizontal axis represents lightness (L*), chroma (C*), and hue (H*), and the vertical axis represents frequency in terms of the number of pixels.

From these histograms, a range including a peak with the highest frequency is determined. FIG. 5B illustrates this range as a selected color range. The selected color range serves as a color variation monitoring area. This range is, for example, an irregular area as illustrated in FIG. 5C. Actually, reference is also made to adjacent rectangular selected color areas, and, if these are of the same color, the selected color areas are concatenated together. This process is repeated for rectangles that are consecutively arranged, thereby obtaining one greater color variation monitoring area. Referring to FIG. 5B, a predetermined threshold is set, and, if the peak does not reach this threshold, it is preferable that this peak not serve as a selected color area, and what is more, not serve as a color variation monitoring area.

Description of Setting Particular Page Numbers

Next, the setting of particular page numbers by the save-unit setter 103 will be described.

FIG. 6A is a diagram illustrating a first example of color variations that occur in units of pages, and a problem that occurs in this case.

FIG. 6A illustrates the case in which one copy has multiple pages (two pages in this case), and multiple copies are printed (three copies in this case). It is illustrated in FIG. 6A that an image G11 on the first page of the first copy varies in color toward red, and an image G12 on the second page varies in color toward blue. The second and third copies have similar color variations. In this case, the image G11 and the image G12 are color variation monitoring areas.

In this case, the four-dimensional LUT is updated on the basis of the color variation of the image G11 on the first page of the first copy, and the updated four-dimensional LUT is applied to the second page of the second copy. The four-dimensional LUT updated here is based on the image G11 which has varied in color toward red, and this four-dimensional LUT is for adjusting this color variation. In other words, the four-dimensional LUT for adjusting the color variation toward red is applied to the image G12 which has varied in color toward blue, which means that the four-dimensional LUT not matching the color variation of the image G12 is used. Therefore, color adjustment is not appropriately performed.

Also in this case, the four-dimensional LUT is updated on the basis of the color variation of the image G12 on the second page of the first copy, and the updated four-dimensional LUT is applied to the first page of the third copy. The four-dimensional LUT updated here is based on the image G12 which has varied in color toward blue, and this four-dimensional LUT is for adjusting this color variation. In other words, the four-dimensional LUT for adjusting the color variation toward blue is applied to the image G11 which has varied in color toward red, which means that the four-dimensional LUT not matching the color variation of the image G11 is used. Therefore, color adjustment is not appropriately performed.

In the exemplary embodiment, this problem is suppressed by setting all pages in one copy as particular page numbers, and generating a four-dimensional LUT on the basis of color variations on all the pages.

FIG. 6B is a diagram illustrating the case in which a four-dimensional LUT is generated on the basis of color variations on all pages.

In this case, the four-dimensional LUT is updated on the basis of color variations of both the image G11 on the first page of the first copy and the image G12 on the second page. The updated four-dimensional LUT is applied to all the pages of the second copy onward, thereby performing color adjustment of images. Since this four-dimensional LUT is based on the image G11, which has varied in color toward red, and the image G12, which has varied in color toward blue, color adjustment toward purple is performed. Accordingly, the color adjustment becomes more appropriate, compared with the case illustrated in FIG. 6A.

Figure 7A:
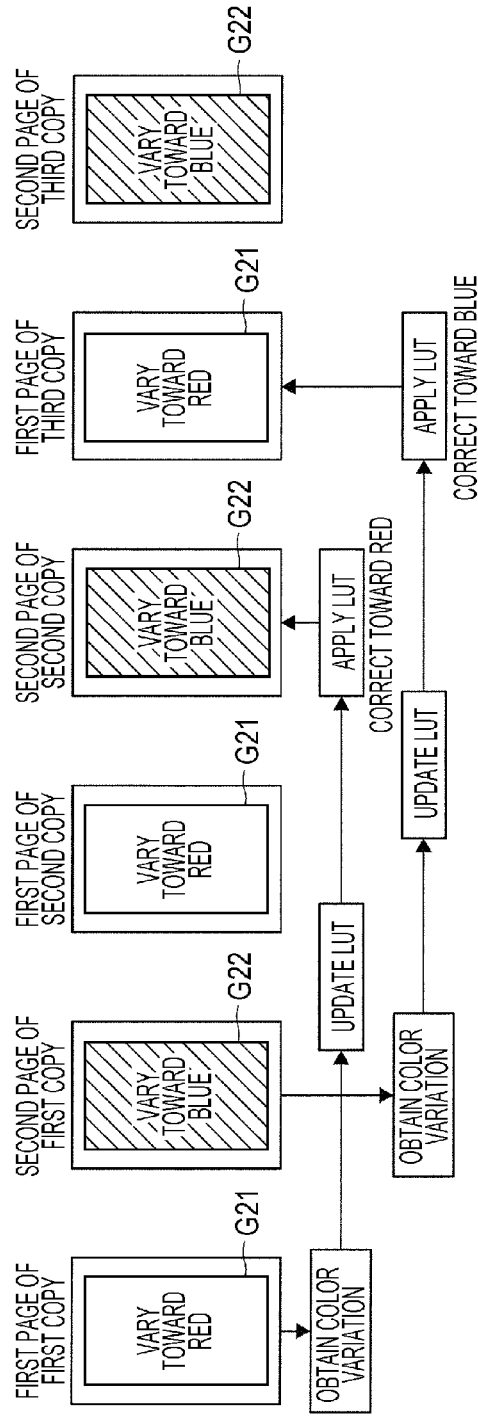
FIG. 7A is a diagram illustrating a second example of color variations that occur in units of pages, and a problem that occurs in this case.

FIG. 7A is a diagram illustrating a second example of color variations that occur in units of pages, and a problem that occurs in this case.

FIG. 7A illustrates the case in which color variations change when color tones change in units of pages. That is, it is illustrated in FIG. 7A that an image G21 on the first page of the first copy varies in color toward red, and an image G22 on the second page varies in color toward blue. The second and third copies have similar color variations. Note that in this case, the image G21 and the image G22 are color variation monitoring areas and have different color tones.

In this case, the four-dimensional LUT is updated on the basis of the color variation of the image G21 on the first page of the first copy, and the updated four-dimensional LUT is applied to the second page of the second copy. The four-dimensional LUT updated here is based on the image G21 which has varied in color toward red, and this four-dimensional LUT is for adjusting this color variation. In other words, the four-dimensional LUT for adjusting the color variation toward red is applied to the image G22 which has varied in color toward blue, which means that the four-dimensional LUT not matching the color variation of the image G22 is used. Therefore, color adjustment is not appropriately performed.

Also in this case, the four-dimensional LUT is updated on the basis of the color variation of the image G22 on the second page of the first copy, and the updated four-dimensional LUT is applied to the first page of the third copy. The four-dimensional LUT updated here is based on the image G22 which has varied in color toward blue, and this four-dimensional LUT is for adjusting this color variation. Therefore, applying this four-dimensional LUT to the image G21 which has varied in color toward red results in inappropriate color adjustment. In other words, the four-dimensional LUT for adjusting the color variation toward blue is applied to the image G21 which has varied in color toward red, which means that the four-dimensional LUT not matching the color variation of the image G21 is used. Therefore, color adjustment is not appropriately performed.

In the exemplary embodiment, like the above case, this problem is suppressed by setting all pages in one copy as particular page numbers, and generating a four-dimensional LUT on the basis of color variations on all the pages.

Figure 7B:
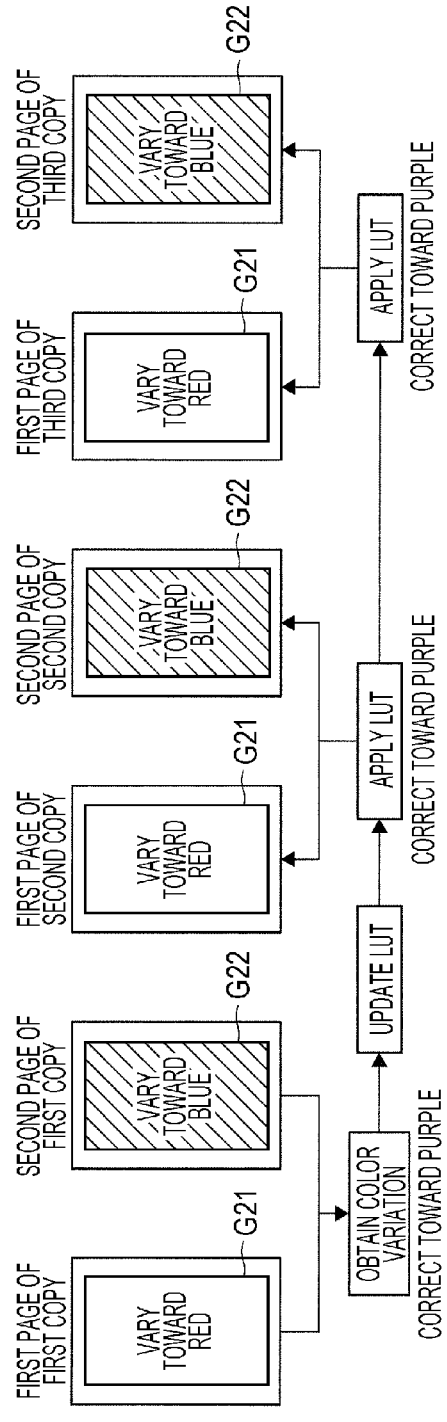
FIG. 7B is a diagram illustrating the case in which a four-dimensional LUT is generated on the basis of color variations on all pages.

FIG. 7B is a diagram illustrating the case in which a four-dimensional LUT is generated on the basis of color variations on all pages.

In this case, the four-dimensional LUT is updated on the basis of color variations of both the image G21 on the first page of the first copy and the image G22 on the second page. The updated four-dimensional LUT is applied to all the pages of the second copy onward, thereby performing color adjustment of images. Since this four-dimensional LUT is based on the image G21, which has varied in color toward red, and the image G22, which has varied in color toward blue, color adjustment toward purple is performed. Accordingly, the color adjustment becomes more appropriate, compared with the case illustrated in FIG. 7A.

FIG. 8A is a diagram illustrating a third example of color variations that occur in units of pages, and a problem that occurs in this case.

FIG. 8A illustrates the case in which color variations change on the front and back sides of paper. That is, it is illustrated in FIG. 8A that an image G31 on the first page (front side) of the first copy varies in color toward red, and an image G32 on the second page (back side) varies in color toward blue. The second and third copies have similar color variations. In this case, the image G31 and the image G32 are color variation monitoring areas.

In this case, the four-dimensional LUT is updated on the basis of the color variation of the image G31 on the first page (front side) of the first copy, and the updated four-dimensional LUT is applied to the second page (back side) of the second copy. The four-dimensional LUT updated here is based on the image G31 which has varied in color toward red, and this four-dimensional LUT is for adjusting this color variation. In other words, the four-dimensional LUT for adjusting the color variation toward red is applied to the image G32 which has varied in color toward blue, which means that the four-dimensional LUT not matching the color variation of the image G32 is used. Therefore, color adjustment is not appropriately performed.

Also in this case, the four-dimensional LUT is updated on the basis of the color variation of the image G32 on the second page (back side) of the first copy, and the updated four-dimensional LUT is applied to the first page (front side) of the third copy. The four-dimensional LUT updated here is based on the image G32 which has varied in color toward blue, and this four-dimensional LUT is for adjusting this color variation. In other words, the four-dimensional LUT for adjusting the color variation toward blue is applied to the image G31 which has varied in color toward red, which means that the four-dimensional LUT not matching the color variation of the image G31 is used. Therefore, color adjustment is not appropriately performed.

In the exemplary embodiment, like the above case, this problem is suppressed by setting all pages in one copy as particular page numbers, and generating a four-dimensional LUT on the basis of color variations on all the pages.

FIG. 8B is a diagram illustrating the case in which a four-dimensional LUT is generated on the basis of color variations on all pages.

In this case, the four-dimensional LUT is updated on the basis of color variations of both the image G31 on the first page (front side) of the first copy and the image G32 on the second page (back side). The updated four-dimensional LUT is applied to all the pages of the second copy onward, thereby performing color adjustment of images. Since this four-dimensional LUT is based on the image G31, which has varied in color toward red, and the image G32, which has varied in color toward blue, color adjustment toward purple is performed. Accordingly, the color adjustment becomes more appropriate, compared with the case illustrated in FIG. 8A.

Figure 9:
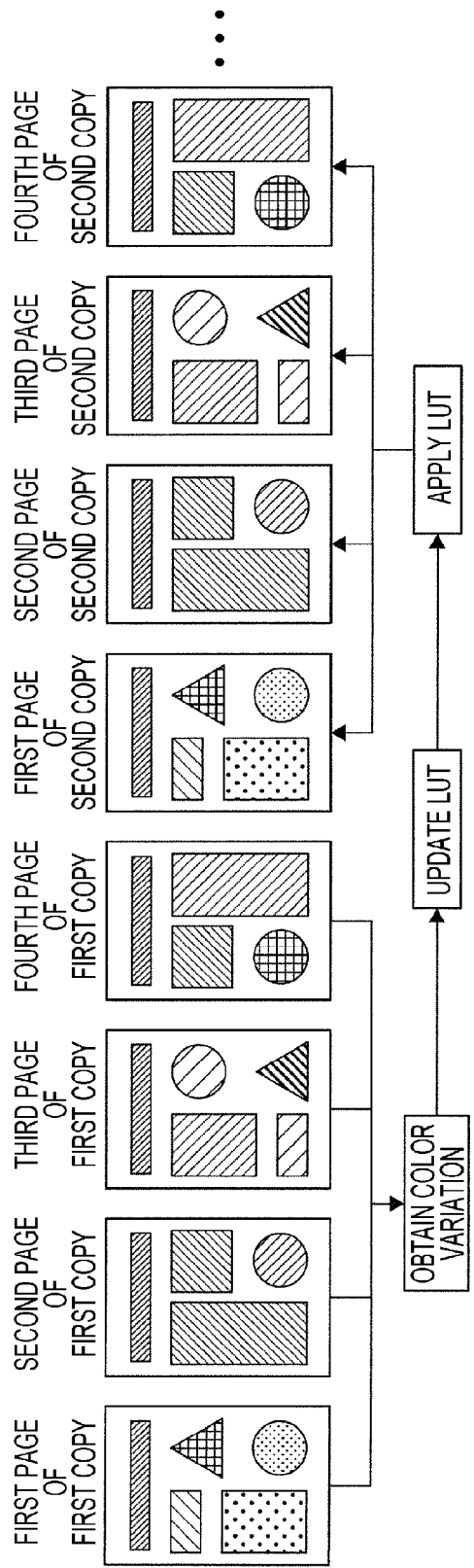
FIG. 9 is a diagram illustrating the case in which one copy includes four pages.

Although the number of pages of one copy is two pages in the above-described examples, FIG. 9 is a diagram illustrating the case in which the number of pages of one copy is four pages.

Figures drawn on pages illustrated in FIG. 9 are all color variation monitoring areas in this case. All pages in one copy are set as particular page numbers, and the four-dimensional LUT is updated on the basis of color variations of all color variation monitoring areas on the first to fourth pages of the first copy. The updated four-dimensional LUT is applied to all the pages of the second copy onward, thereby performing color adjustment of images.

Although all pages in one copy are set as particular page numbers in the above-described examples, the case is not limited thereto.

Figure 10:
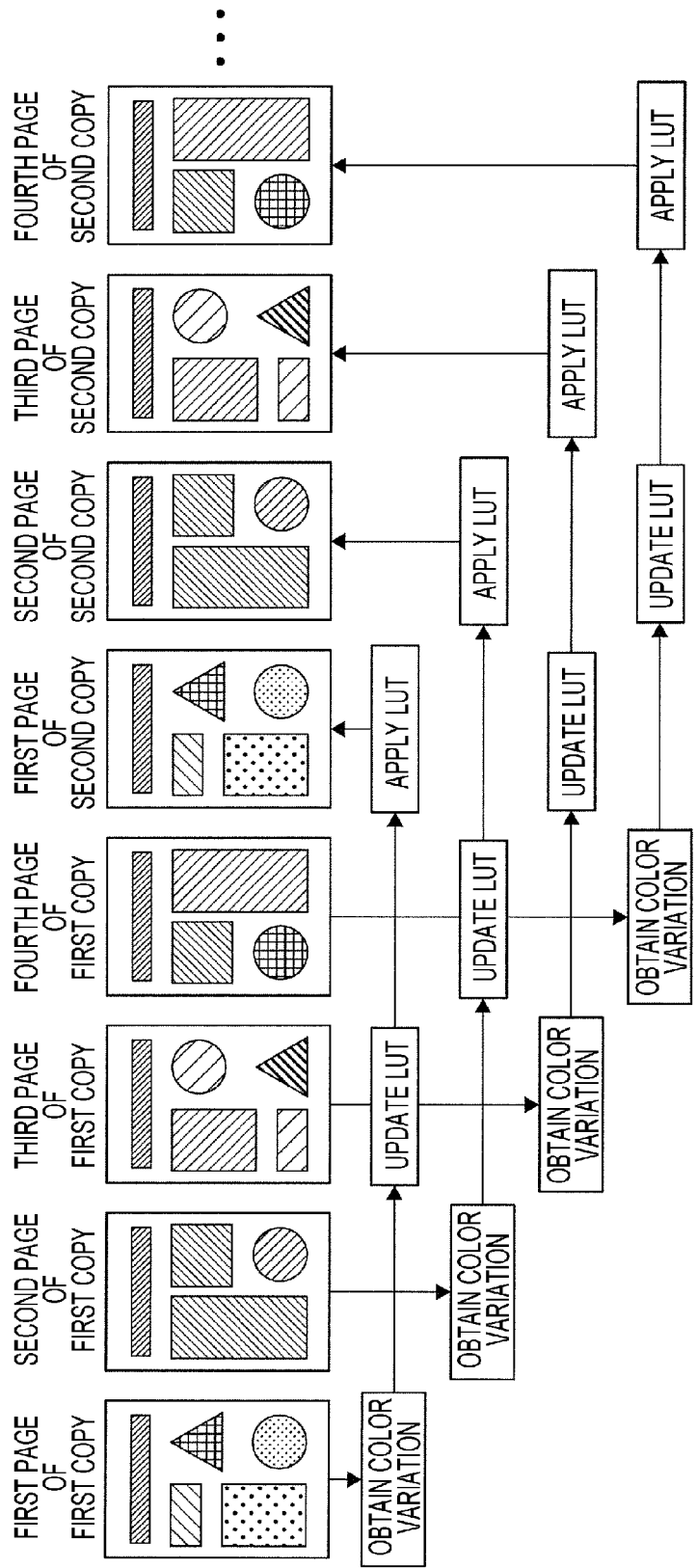
FIG. 10 is a diagram illustrating the case in which each page in one copy is set as a particular page number.

FIG. 10 is a diagram illustrating the case in which each page in one copy is set as a particular page number.

In this case, the four-dimensional LUT is updated on the basis of color variations of all color variation monitoring areas on the first page of the first copy. The updated four-dimensional LUT is applied to the first page of the second copy onward, thereby performing color adjustment of images. Similarly, the four-dimensional LUT is updated on the basis of color variations of color variation monitoring areas on the second, third, and fourth pages of the first copy. The updated four-dimensional LUT is applied to the second, third, and fourth pages of the second copy onward, thereby performing color adjustment of images.

In doing so, the more matching four-dimensional LUT may be applied to identical pages of multiple copies, thereby increasing the accuracy of color adjustment of images.

Figure 11:
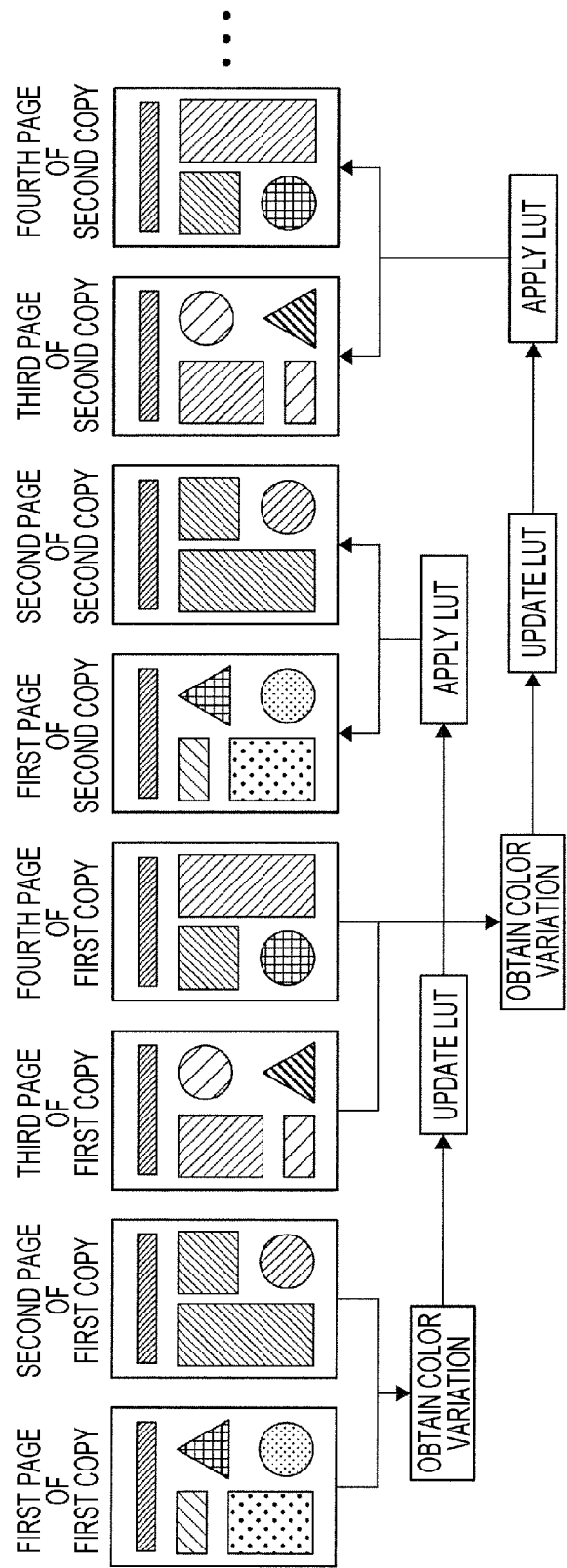
FIG. 11 is a diagram illustrating the case in which each double page spread in one copy is set as a particular page number.

FIG. 11 is a diagram illustrating the case in which each double page spread in one copy is set as a particular page number.

In this case, the four-dimensional LUT is updated on the basis of color variations of all color variation monitoring areas on the first and second pages of the first copy. The updated four-dimensional LUT is applied to the first and second pages of the second copy onward, thereby performing color adjustment of images. Similarly, the four-dimensional LUT is updated on the basis of color variations of color variation monitoring areas on the third and fourth pages of the first copy. The updated four-dimensional LUT is applied to the third and fourth pages of the second copy onward, thereby performing color adjustment of images. Note that, in this case, it is assumed that the first and second pages are a double page spread, and the third and fourth pages are also a double page spread.

Accordingly, the same color adjustment may be performed on a double page spread, which is color adjustment that is less likely to give the user who is looking at the double page spread a feeling that there is something wrong or strange.

Figure 12:
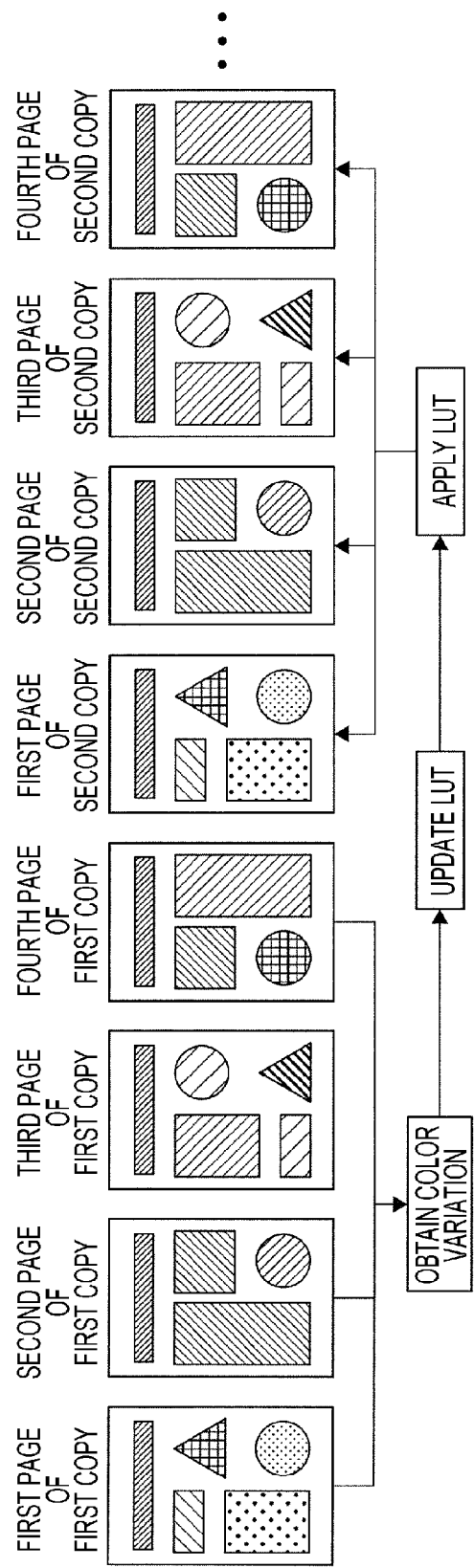
FIG. 12 is a diagram illustrating the case in which each user-set page in one copy is set as a particular page number.

FIG. 12 is a diagram illustrating the case in which each user-set page in one copy is set as a particular page number.

In this case, the four-dimensional LUT is updated on the basis of color variations of all color variation monitoring areas on the first, second, and fourth pages of the first copy. The updated four-dimensional LUT is applied to all the pages of the second copy onward, thereby performing color adjustment of images.

In doing so, a page for which the user determines that no color adjustment is necessary is omitted. This page is, for example, a page that consists only of black characters.

Figure 13:
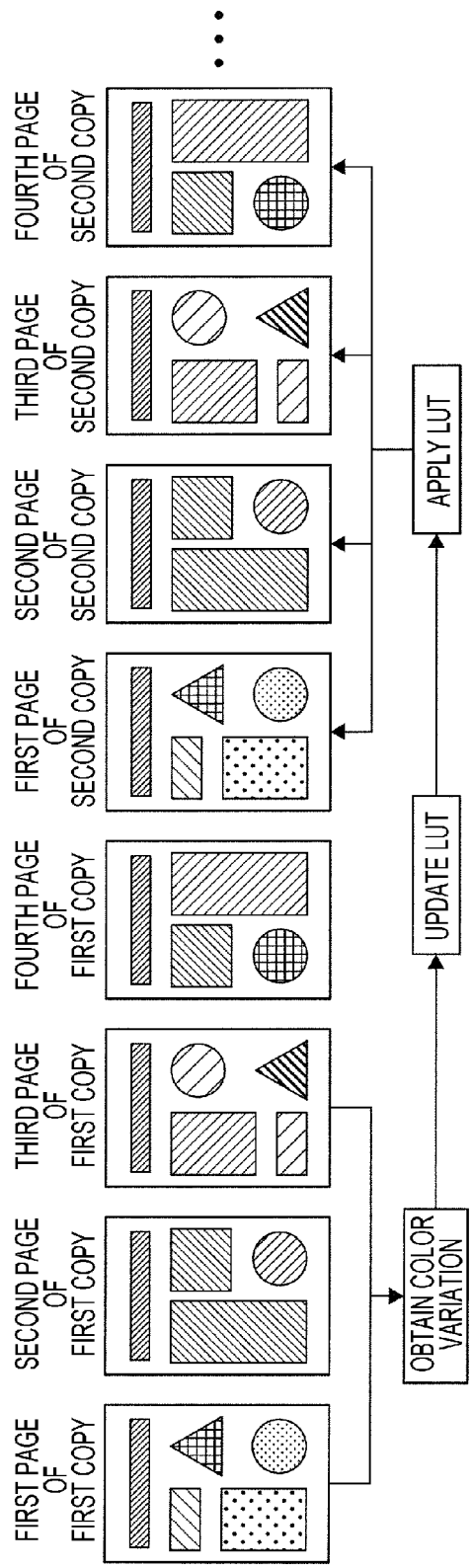
FIG. 13 is a diagram illustrating the case in which each page in one copy excluding skipped pages is set as a particular page number.

FIG. 13 is a diagram illustrating the case in which each page in one copy excluding skipped pages is set as a particular page number.

In this case, the four-dimensional LUT is updated on the basis of color variations of all color variation monitoring areas on the odd pages of the first copy. In other words, the even pages are skipped, and color data of the odd pages, after having skipped the even pages, is used to update the four-dimensional LUT. The updated four-dimensional LUT is applied to all the pages of the second copy onward, thereby performing color adjustment of images.

In doing so, a process of generating a four-dimensional LUT may be speeded up.

Although particular page numbers are set in advance in the above-described examples, the case is not limited thereto. For example, the save-unit setter 103 may analyze an image and accordingly perform the setting.

Figure 14:
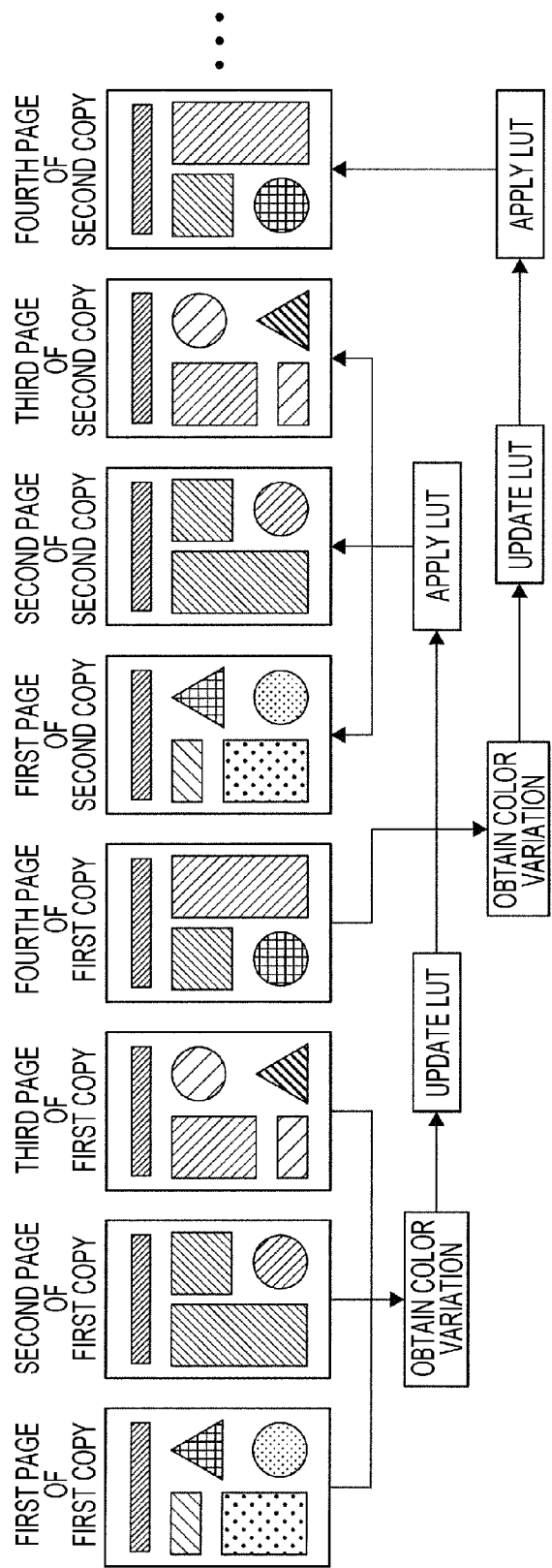
FIG. 14 is a diagram illustrating the case in which particular page numbers are set by a save-unit setter.

FIG. 14 is a diagram illustrating the case in which particular page numbers are set by the save-unit setter 103.

In this case, the save-unit setter 103 sets particular page numbers on the basis of color types included in color variation monitoring areas within one copy.

Specifically, the save-unit setter 103 selects pages from which color data in the entirety of a predetermined color space is obtained. In the exemplary embodiment, for example, the L*a*b* color space is used as the color space. Referring to FIG. 14, it is assumed that the first page of the first copy includes a brownish color variation monitoring area, the second page includes a bluish color variation monitoring area, and the third page includes a greenish color variation monitoring area. It is also assumed that the fourth page includes all of brownish, bluish, and greenish color variation monitoring areas.

In this case, the save-unit setter 103 analyzes a raster image, thereby selecting pages that have all of brownish, bluish, and greenish color variation monitoring areas. For example, the first to third pages are selected, and the fourth page is additionally selected.

The four-dimensional LUT is updated on the basis of color variations of color variation monitoring areas on the first to third pages of the first copy. The updated four-dimensional LUT is applied to the first to third pages of the second copy onward, thereby performing color adjustment of images. Furthermore, the four-dimensional LUT is updated on the basis of color variations of color variation monitoring areas on the fourth page of the first copy. The updated four-dimensional LUT is applied to the fourth page of the second copy onward, thereby performing color adjustment of images.

In doing so, particular page numbers are automatically set.

Description of Color Variation Prediction

Next, color variation prediction performed by the color variation data predictor 104 will be described.

Color types included in color variation monitoring information generated by the color variation monitoring information generator 102 depend on color types included in the original image. In the case of the exemplary embodiment, the number of color types is about fifty types in the case of using many colors, as in a landscape image, for example, and is about six types in the case of using only a few colors, as in a person's face image, for example.

This number of color types is insufficient to serve as information for updating the four-dimensional LUT. Therefore, in the exemplary embodiment, a process of predicting color variations is performed for colors other than those included in color variation monitoring areas. Actually, color variations of colors corresponding to lattice points of the four-dimensional LUT are predicted from the above-described color types. A lattice point is set for, for example, each of values obtained by dividing each of YMCK in the YMCK space by eight (0% to 100% is divided by eight), and these lattice points are the so-called nine lattice points. In this case, the number of lattice points is $9^4 = 6561$. As will be described later, color variations of the chromatic components L*, a*, and b* in the L*a*b* color space corresponding to the lattice points are predicted.

Figure 15A:
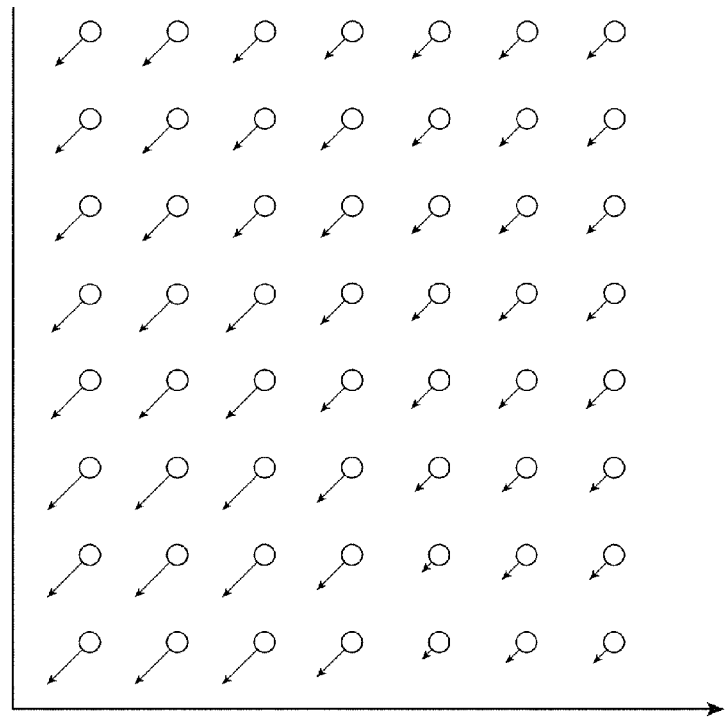
FIG. 15A is a diagram illustrating a color variation tendency.

FIG. 15A is a diagram illustrating a color variation tendency.

FIG. 15A conceptually represents chromatic components corresponding to the lattice points of a four-dimensional LUT in a predetermined color space. Color variations of the chromatic components are represented by arrows. In this case, the direction of each arrow represents the direction of a color variation in the predetermined color space. The size of each arrow represents the magnitude of a color variation.

As illustrated in FIG. 15A, the color variations are directed in substantially the same direction in the color space, and no color variations in a particular area are directed in a different direction. Regarding the magnitude of the color variations in the entire color space, there are areas where color variations are great and other areas where color variations are small. Note that the magnitude of color variations continuously changes, and color variations at positions close to each other in the color space have similar magnitudes.

In other words, even when only color variations of fewer chromatic components in the color space are known, the overall color variations are predictable.

Figure 15B:
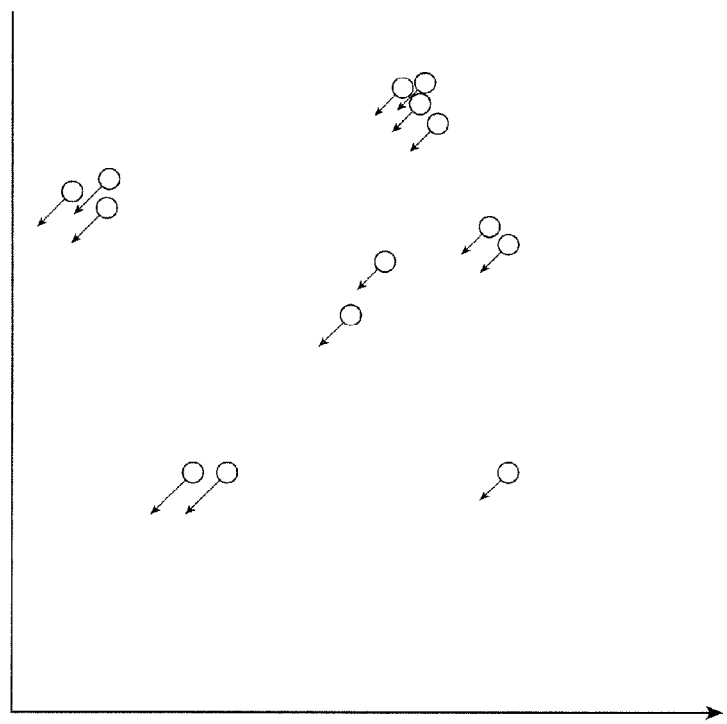
FIG. 15B is a conceptual diagram illustrating places of chromatic components with known color variations.

FIG. 15B is a conceptual diagram illustrating places of chromatic components with known color variations. In short, FIG. 15B illustrates color variations obtained from color data obtained in color variation monitoring areas. In this case, color variations of chromatic components at fourteen points are illustrated by a method that is the same as or similar to that in FIG. 15A. From FIG. 15B, color variations of the entire color space are predicted, thereby obtaining the overall color variations as illustrated in FIG. 15A.

In the exemplary embodiment, the L*a*b* color space is used as the color space. Color variations of chromatic components (L*, a*, and b*) corresponding to the lattice points of the four-dimensional LUT are obtained. In the exemplary embodiment, the difference in chromaticity (difference) is used as the magnitude of color variations. Specifically, the obtained are $\Delta a^*$, $\Delta b^*$, and $\Delta L^*$. By using the differences as above instead of using the values of chromatic components themselves, it becomes easier to predict color variations.

In this manner, the color variation data predictor 104 obtains color variations of color data corresponding to color variation monitoring areas as differences in chromaticity in a predetermined color space (the L*a*b* color space in this case), and, from the direction and magnitude of color variations in this color space, predicts color variations of chromatic components other than the color data corresponding to the color variation monitoring areas. In other words, color variations are regarded as vectors in a predetermined color space, and, from the direction and magnitude of each of these vectors, color variations of other chromatic components are predicted.

Description of Operation of Color Processor 100

Figure 16:
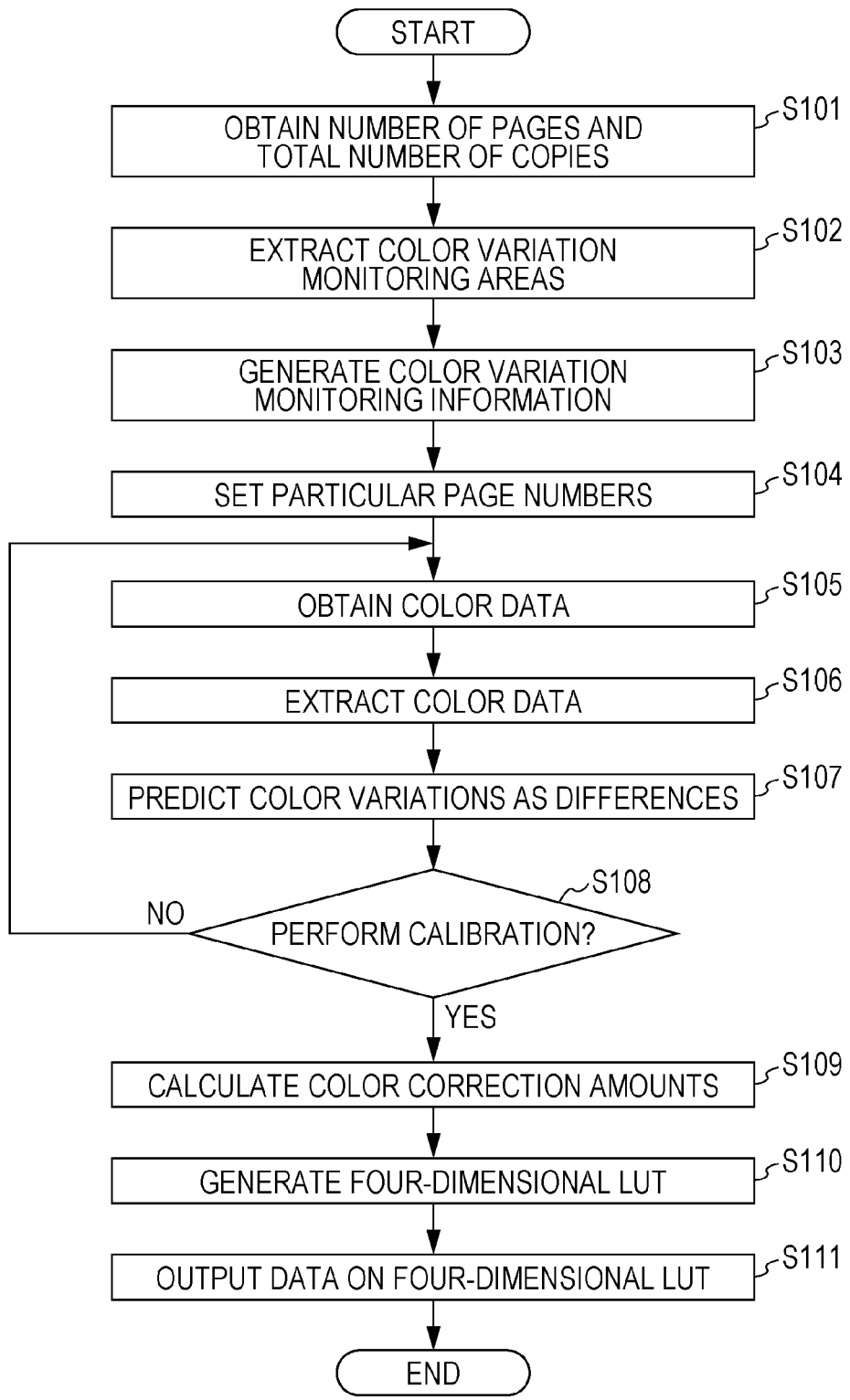
FIG. 16 is a flowchart describing an operation of a color processor.

FIG. 16 is a flowchart describing an operation of the color processor 100.

Hereinafter, the operation of the color processor 100 will be described using FIG. 2 and FIG. 16.

First, the number-of-page/copy obtainer 101 obtains the number of pages per copy to be output, and the total number of copies, on the basis of a print job transmitted from the controller 80 (step S101).

Next, the color variation monitoring information generator 102 extracts color variation monitoring areas by using the method described with reference to FIGS. 3A to 4C (step S102). Furthermore, the color variation monitoring information generator 102 generates color variation monitoring information regarding the extracted color variation monitoring areas (step S103).

Next, the save-unit setter 103 sets particular page numbers by using the method described with reference to FIGS. 6A to 14 (step S104). The setting may be done by the user, or, as has been described with reference to FIG. 14, the save-unit setter 103 may automatically do the setting.

Next, the color variation data predictor 104 obtains, from the image reading section 60, color data of an image output by the image forming section 10 (step S105). The color data includes, as has been described above, the L*a*b* values. The color variation data predictor 104 refers to the color variation monitoring information, and extracts color data corresponding to color variation monitoring areas on the particular page numbers (step S106). The color variation data predictor 104 further predicts, from the extracted color data, color variations as differences by using the method described with reference to FIGS. 15A and 15B (step S107). Here, $\Delta a^*$, $\Delta b^*$, and $\Delta L^*$ of chromatic components corresponding to the lattice points of the four-dimensional LUT in the entire L*a*b* color space are predicted.

Next, the determiner 105 determines whether to update the four-dimensional LUT for performing color adjustment (whether to perform calibration), on the basis of the color variations predicted by the color variation data predictor 104 (step S108).

In the case where the color variations are small and the determiner 105 determines not to update the four-dimensional LUT (NO in step S108), the color processor 100 returns to step S105 and continues monitoring the color variations.

In contrast, in the case where the color variations are great and the determiner 105 determines to update the four-dimensional LUT (YES in step S108), the color correction amount calculator 106 calculates, from the differences $\Delta a^*$, $\Delta b^*$, and $\Delta L^*$ predicted by the color variation data predictor 104, $\Delta Y$, $\Delta M$, $\Delta C$, and $\Delta K$ as color correction amounts (step S109).

The conversion relationship generator 107 generates a four-dimensional LUT by using the color correction amounts $\Delta Y$, $\Delta M$, $\Delta C$, and $\Delta K$ (step S110).

Data on the generated four-dimensional LUT is output from the conversion relationship generator 107 to the image processor 90 (step S111). The image processor 90 updates the four-dimensional LUT. Accordingly, the new four-dimensional LUT, which takes the color variations of the image forming section 10 into consideration, is applied, thereby performing more appropriate color adjustment.

According to the above-described image forming apparatus 1, calibration is performed by using a user image, without outputting a color patch, compared with a method of the related art that periodically outputs a color patch and performs color measurement. Therefore, calibration may be performed in real time, and the printing productivity is less likely to decrease. Although it has been hitherto difficult to handle short-term color variations since calibration has been done periodically, handling such color variations becomes easier in this exemplary embodiment and calibration may be performed at more appropriate timing.

When the color variation data predictor 104 predicts color variations, prediction of color variations is designed so that color variations change smoothly in the color space. In doing so, it becomes easier to maintain gradation after the color adjustment, and gradation differences become less likely to occur due to the color adjustment. Furthermore, predicting the color variations in the entire L*a*b* color space facilitates outputting of multiple pages and further color adjustment of the next print job.

In the exemplary embodiment, the conversion relationship generator 107 generates a four-dimensional LUT on the basis of the first copy out of multiple copies, and the image processor 90 performs color adjustment of images of the second copy onward of the multiple copies. Accordingly, a four-dimensional LUT that better matches pages printed in the first copy is generated. Color adjustment of images of the second copy onward is performed with higher accuracy. In addition, the four-dimensional LUT is unique to the set particular page numbers.

Although the determiner 105 is provided in the above-described example, the determiner 105 need not be provided.

Although the image forming apparatus 1 which uses an electrophotographic system has been discussed in the above-described example, an inkjet type apparatus may be used. Furthermore, although the L*a*b* color space is used in the color variation data predictor 104 and so forth, the color space is not limited thereto, and another color space may be used as long as the color space is capable of quantifying color. Although a four-dimensional LUT is generated as a conversion relationship in the above-described example, a conversion relationship is not limited thereto, and, for example, a one-dimensional LUT may be generated.

Although the exemplary embodiment has been described as above, the technical scope of the present invention is not limited to the range described in the exemplary embodiment. It is clear from the scope of claims that various changes or modifications added to the exemplary embodiment are also included in the technical scope of the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus comprising:
an area group manager that extracts, as an area group, a particular area on each page from image data in which one copy is constituted of a plurality of pages, and manages the area group in association with a page number;
a predictor that obtains color data of the image data output by an image forming section, and predicts a color variation on the basis of color data corresponding to the area group; and
a conversion relationship generator that generates, on the basis of the color variation of the area group corresponding to a particular page number, a conversion relationship unique to the particular page number as a conversion relationship for performing color adjustment on another copy of the plurality of pages output by the image forming section.

2. The color processing apparatus according to claim 1, wherein, in a case where the image forming section outputs a plurality of copies including identical image data, the conversion relationship generator generates the conversion relationship on the basis of a first copy, the conversion relationship being applied to the another copy onward for performing color adjustment of an image.

3. The color processing apparatus according to claim 1, further comprising a setter that sets the particular page number in one copy as a unit for performing color adjustment of the image forming section.

4. The color processing apparatus according to claim 3, wherein the setter sets the particular page number of all pages, each page, each double page spread, each user-set page, or each page excluding skipped pages, within one copy out of a plurality of copies.

5. The color processing apparatus according to claim 3, wherein the setter sets the particular page number on the basis of a color type included in the area group within one copy out of a plurality of copies.

6. The color processing apparatus according to claim 1, wherein the predictor predicts the color variation as a difference.

7. The color processing apparatus according to claim 1, wherein the image data is image data on an image included in a print job transmitted from a user.

8. An image forming system comprising:
an image forming section that forms an image on a recording material;
a color adjuster that performs color adjustment of the image formed by the image forming section; and
a conversion relationship generating section that generates a conversion relationship used for performing color adjustment by the color adjuster,
wherein the conversion relationship generating section includes
an area group manager that extracts, as an area group, a particular area on each page from image data in which one copy is constituted of a plurality of pages, and manages the area group in association with a page number,
a predictor that obtains color data of the image data output by the image forming section, and predicts a color variation on the basis of color data corresponding to the area group, and
a conversion relationship generator that generates, on the basis of the color variation of the area group corresponding to a particular page number, a conversion relationship unique to the particular page number as a conversion relationship for performing color adjustment on another copy of the plurality of pages output by the image forming section.

9. The image forming system according to claim 8, wherein, in a case where the image forming section outputs a plurality of copies including identical image data, the conversion relationship generator of the conversion relationship generating section generates the conversion relationship on the basis of a first copy, and
wherein the color adjuster applies the conversion relationship to the another copy onward, and performs color adjustment of an image.

10. An information processing method comprising:
extracting, as an area group, a particular area on each page from image data in which one copy is constituted of a plurality of pages, and managing the area group in association with a page number;
obtaining color data of the image data output by an image forming section, and predicting a color variation on the basis of color data corresponding to the area group;
generating, on the basis of the color variation of the area group corresponding to a particular page number, a conversion relationship unique to the particular page number as a conversion relationship for performing color adjustment of the image forming section; and
outputting another copy of the plurality of pages for which the color adjustment has been performed.

* * * * *